US012235644B2

(12) United States Patent
Liang et al.

(10) Patent No.: US 12,235,644 B2
(45) Date of Patent: Feb. 25, 2025

(54) UNMANNED AERIAL VEHICLE (UAV)-ASSISTED HANGING RING ROBOT FOR LIVE INSTALLATION AND GROUNDING

(71) Applicants: State Grid Fujian Electric Power Co., Ltd., Fujian (CN); STATE GRID FUJIAN SANMING ELECTRIC POWER SUPPLY COMPANY, Fujian (CN)

(72) Inventors: Xinhai Liang, Fujian (CN); Yanghong Lin, Fujian (CN); Jinshu Lin, Fujian (CN); Qiti Wang, Fujian (CN); Dijing Zheng, Fujian (CN); Guangyi Pei, Fujian (CN); Weifeng Xie, Fujian (CN); Mufu Chen, Fujian (CN); Guangming Luo, Fujian (CN); Zhiqin Chen, Fujian (CN); Shaofen Zhu, Fujian (CN)

(73) Assignees: State Grid Fujian Electric Power Co., Ltd., Fuzhou (CN); STATE GRID FUJIAN SANMING ELECTRIC POWER SUPPLY COMPANY, Sanming (CN)

(*) Notice: Subject to any disclaimer, the term of this patent is extended or adjusted under 35 U.S.C. 154(b) by 596 days.

(21) Appl. No.: 17/701,704

(22) Filed: Mar. 23, 2022

(65) Prior Publication Data
US 2022/0214687 A1 Jul. 7, 2022

Related U.S. Application Data

(63) Continuation of application No. PCT/CN2021/136878, filed on Dec. 9, 2021.

(30) Foreign Application Priority Data

Dec. 10, 2020 (CN) .......................... 202011435695.8

(51) Int. Cl.
*H02G 1/02* (2006.01)
*B64C 39/06* (2006.01)
(Continued)

(52) U.S. Cl.
CPC ............ *G05D 1/0094* (2013.01); *B64C 39/06* (2013.01); *B64U 2101/00* (2023.01)

(58) Field of Classification Search
CPC ........ H02G 13/00; H02G 13/40; H02G 13/80; H02G 1/02; H02G 1/06; G05D 1/0094;
(Continued)

(56) References Cited

U.S. PATENT DOCUMENTS 10,186,348 B2 * 1/2019 Davis ........................ H02G 1/02
10,613,429 B1 * 4/2020 Wingo ....................... H02G 1/02
(Continued)

FOREIGN PATENT DOCUMENTS

CN 106737756 A 5/2017

*Primary Examiner* — Angel R Estrada (57) ABSTRACT

An unmanned aerial vehicle (UAV)-assisted hanging ring robot for live installation and grounding includes a hanging tray, a wire hanging bracket, a hanging wire, an overturning stay wire, an overturning frame, a support, an electric lock, a walking wheel, a driving motor, a workbench, a clamp seat, a puncture clamp, a tightening mechanism, a remote controller, and a controller. The hanging tray is installed at the bottom of a UAV, one end of the overturning stay wire is connected to the overturning frame, the other end thereof hangs on ground, the driving motor is installed on the overturning frame, the walking wheel is connected to the driving motor, the puncture clamp is installed on the clamp seat, the tightening mechanism is installed on the workbench, and connected to the puncture clamp, and the electric lock, tightening mechanism, driving motor, and remote controller are connected to the controller.

14 Claims, 11 Drawing Sheets

(51) Int. Cl.
*G05D 1/00* (2006.01)
*B64U 101/00* (2023.01)

(58) Field of Classification Search
CPC .......... G05D 1/00; B64C 39/06; B64C 39/02; B64C 39/024; B64U 2101/00; H01R 4/66; H05K 5/00
USPC ...... 174/6, 5 R, 5 SG, 51, 78, 138 R; 361/1, 361/212, 799; 439/92, 98, 100, 108
See application file for complete search history.

(56) References Cited

U.S. PATENT DOCUMENTS

| | | | |
|---|---|---|---|
| 11,130,572 B2* | 9/2021 | Ciesielczyk | H02G 1/02 |
| 11,368,002 B2* | 6/2022 | Lavoie | H02G 1/02 |
| 12,046,887 B2* | 7/2024 | Johansen | H02G 1/02 |
| 12,097,956 B2* | 9/2024 | Lavoie | H02G 1/02 |

\* cited by examiner

UNMANNED AERIAL VEHICLE (UAV)-ASSISTED HANGING RING ROBOT FOR LIVE INSTALLATION AND GROUNDING

CROSS REFERENCE TO RELATED APPLICATIONS

The present application is a Continuation Application of PCT Application No. PCT/CN2021/136878 filed on Dec. 9, 2021, which claims the benefit of Chinese Patent Application No. 202011435695.8 filed on Dec. 10, 2020. All the above are hereby incorporated by reference in their entirety.

TECHNICAL FIELD

The present disclosure relates to the technical field of auxiliary devices of a power system, and specifically, to an unmanned aerial vehicle (UAV)-assisted hanging ring robot for live installation and grounding.

BACKGROUND

A high-voltage ground wire is a kind of safety appliance for temporary short-circuit grounding of a power-off device, so as to prevent the device from being suddenly powered on again and prevent an induced voltage generated by an adjacent high-voltage live device from harming a human body during power-off maintenance or other operations for the high-voltage device, and discharge a residual charge of the power-off device. According to relevant power specifications, a ground clamp needs to be reserved and installed at an end, near a tower, of each conductor to facilitate ground wire lapping during maintenance. At present, many lines in operation are not equipped with ground clamps, and these ground clamps need to be manually installed when related devices are electrified. According to a current method for installing a ground clamp on a live conductor, after being transported to an end near the conductor by using an insulated bucket arm truck, an operator wears insulated shielding clothes, and installs the ground clamp by hand by using tools such as a clamp and a torque wrench. This method is affected by space and a high-altitude operation environment, and has a large difficulty coefficient. As a research and development subject, some manufacturers have developed a semi-automatic mechanical arm, which is transported to a position near the conductor by a person or a bucket arm truck for installation.

For example, the Chinese patent CN106737756A published on May 31, 2017 discloses a robot system for power inspection and ground wire operations based on a high-voltage distribution line. The robot system includes a robot body, and the robot body includes a mobile mechanism and a three degree of freedom mechanical operation arm that are connected to each other, and a control box installed on the robot body. The control box is internally equipped with a control unit, a first power module, and a first communication module. The first power module is connected to the control unit, the control unit is connected to a driving module, and the driving module is connected to the mobile mechanism and the three degree of freedom mechanical operation arm. The control unit is connected to a handheld control terminal and a ground control terminal by using the first communication module. The technical solution still needs to rely on a large auxiliary device, which makes it difficult and complex to perform an operation, and imposes a high requirement for the operator.

SUMMARY

The present disclosure is intended to resolve a technical problem that it is inconvenient to temporarily install a ground wire on an overhead conductor. The present disclosure provides a UAV-assisted hanging ring robot for live installation and grounding, to ground an overhead conductor conveniently with the help of a UAV.

To resolve the above technical problem, the present disclosure adopts the following technical solution: A UAV-assisted hanging ring robot for live installation and grounding is used together with a UAV, and includes a hanging tray, a wire hanging bracket, a hanging wire, an overturning stay wire, an overturning frame, a support, an electric lock, a walking wheel, a driving motor, a workbench, a clamp seat, a puncture clamp, a tightening mechanism, a remote controller, and a controller, where the hanging tray is installed at a bottom of the UAV, the wire hanging bracket is fixedly connected to the hanging tray, and the hanging wire is connected to wire hanging bracket; both the support and the clamp seat are installed on the workbench, the overturning frame is rotatably installed on the support, the electric lock is installed on the support, the overturning frame is provided with a lockhole matching the electric lock, one end of the overturning stay wire is connected to the overturning frame, the other end of the overturning stay wire hangs on ground, the walking wheel is rotatably installed on the overturning frame, the driving motor is installed on the overturning frame, and the walking wheel is connected to the driving motor; the puncture clamp is installed on the clamp seat, and the tightening mechanism is installed on the workbench and connected to a tightening screw of the puncture clamp; and the electric lock, the tightening mechanism, the driving motor, and the remote controller are connected to the controller. The hanging wire is lifted by the UAV, a lowest end of the hanging wire is raised to a position higher than a target conductor, and a descent height of the UAV is controlled, such that the hanging wire is located on one side of the target conductor. After that, the UAV is controlled to cross the target conductor and release the hanging wire, and the other end of the hanging wire falls to the ground under the action of gravity. One end of the hanging wire is connected to a hanging point of the robot, and the other end is pulled by an operator, to quickly raise the robot to below the target conductor. Then, the overturning frame installed with the walking wheel is overturned by using the overturning stay wire, and the hanging wire is continuously pulled to make the walking wheel higher than the target conductor. Then, the overturning stay wire is released, and the overturning frame recovers automatically. The walking wheel is stuck on the target conductor, and then the electric lock is locked. Driven by the walking wheel, the robot walks to a predetermined position along the target conductor. Finally, the tightening mechanism is started to drive the puncture clamp to close to connect the target conductor, and the puncture clamp is connected to a ground clamp in advance to ground the target conductor.

Preferably, the robot further includes a first wire hanging head and a second wire hanging head, where the hanging wire includes a first hanging wire and a second hanging wire, both ends of the wire hanging bracket are respectively connected to the first wire hanging head and the second wire hanging head, the first hanging wire is fixedly connected to the first wire hanging head, the second hanging wire is connected to the second wire hanging head, the workbench is provided with two wire hanging points, and a length of the wire hanging bracket corresponds to a distance between the two wire hanging points of the workbench.

Preferably, the wire hanging bracket includes a bushing, a left hanging rod, a right hanging rod, a left rack, a right rack, a driving gear, and a driving mechanism, the left hanging rod and the right hanging rod are sleeved on a left and a right of the bushing respectively, the left rack is fixedly connected to the left hanging rod, the right rack is fixedly connected to the right hanging rod, the driving gear is rotatably connected to the bushing, the driving mechanism is connected to the driving gear, both the left rack and the right rack are meshed with the driving gear, the left hanging rod is connected to the first wire hanging head, and the right hanging rod is connected to the second wire hanging head. The driving mechanism drives the driving gear to rotate, to drive the left rack and the right rack to move, such that extension elongations of the left hanging rod and the right hanging rod are changed to adjust the length of the wire hanging bracket to adapt to different robots.

Preferably, the driving mechanism includes a friction rod, a friction wheel, a fixed shaft, a driving pipe, a driving spring, a locking spring, and a locking ring, the fixed shaft is fixedly connected to the bushing, the driving gear is rotatably connected to the fixed shaft, the friction wheel is concentrically and fixedly connected to the driving gear, the driving pipe is fixedly connected to the bushing, the driving spring is installed in the driving pipe, one end of the friction rod is sleeved into the driving pipe, one end of the driving spring is fixedly connected to the driving pipe, the other end of the driving spring is fixedly connected to the friction rod, both ends of the driving spring are connected to an electronic switch K1 and a direct current (DC) power supply BT1 respectively by using wires, the friction rod is abutted with the friction wheel, the friction wheel is hollow and provided with an opening at one end away from the driving gear, one end, close to the driving gear, of the friction wheel is provided with a locking hole, the locking ring is sleeved on the fixed shaft, the fixed shaft is provided with a clamping strip, the locking ring is provided with a clamping groove, the clamping strip is clamped with the clamping groove, the locking ring is provided with a protrusion matching the locking hole, one end of the locking spring is fixedly connected to the locking ring, the other end of the locking spring is fixedly connected to the bushing, and both ends of the locking spring are connected to an electronic switch K2 and a DC power supply BT2 respectively by using wires. The driving spring contracts when a current is applied to the driving spring. An amount of contraction is related to the applied current. A size of the current applied to the driving spring is adjusted through PWM control of the electronic switch K1, so as to control the amount of contraction of the driving spring. Similarly, the locking ring and the locking hole are locked or separated through PWM control of the electronic switch K2. When the driving spring contracts, the friction rod is driven to move, so as to drive the friction wheel to rotate, in other words, drive the driving gear to rotate. When the electronic switch K1 remains disconnected, the driving spring stretches, and the friction wheel rotates reversely. In this case, the electronic switch K2 is also controlled to be disconnected, and the locking spring stretches to tightly lock the locking ring and the locking hole. In this way, the friction wheel cannot rotate reversely because it is locked, in other words, the driving gear rotates along one direction. The friction wheel only needs to be locked when the driving spring contracts and unlocked when the driving spring stretches, to make the driving gear rotate along another direction.

Preferably, the first wire hanging head and the second wire hanging head each are provided with a groove, an inner wall of the groove is provided with a notch, tail ends of the left hanging rod and the right hanging rod each are installed with a hanging mechanism, and the hanging mechanism is connected to the groove; and the hanging mechanism includes a hanging spring, a hanging joint, and a hanging ball, the tail ends of the left hanging rod and the right hanging rod each are provided with a blind hole, a wall of the blind hole is provided with a through hole along a radial direction, the hanging ball is placed in the through hole, the hanging joint is sleeved into an opening of the blind hole, one end of the hanging spring is fixedly connected to the bottom of the blind hole, the other end of the hanging spring is connected to the hanging joint, both ends of the hanging spring are connected to an electronic switch K3 and a DC power supply BT3 respectively by using wires, the hanging joint matches the grooves of the first wire hanging head and the second wire hanging head, the hanging joint is abutted with the hanging spring, an outer wall of the hanging joint is provided with a locking portion for extruding the hanging ball out of outer walls of the left hanging rod and the right hanging rod, and the outer wall of the hanging joint is further provided with an accommodation portion for retracting the hanging ball into the outer walls of the left hanging rod and the right hanging rod. When the hanging spring contracts, the hanging joint is pulled to rise, such that the accommodation portion is abutted with the hanging ball. The first wire hanging head and the second wire hanging head squeeze the hanging ball into the left hanging rod and the right hanging rod under the action of gravity, and the first wire hanging head and the second wire hanging head immediately fall to the ground.

Preferably, the robot further includes a stay wire head and a stayed pole, where the stayed pole is fixedly installed on the overturning frame, the stay wire head is rotatably connected to the stayed pole, and the overturning stay wire is fixedly connected to the stay wire head.

Preferably, the robot further includes a pressure spring, where the driving motor is connected to a square shaft, the overturning frame is provided with a walking wheel installation groove, the square shaft is rotatably connected to the walking wheel installation groove, the walking wheel is connected to the square shaft, and the pressure spring is installed between the walking wheel and the walking wheel installation groove.

The present disclosure has the following substantive effects: The hanging wire is lifted by the UAV, the lowest end of the hanging wire is raised to the position higher than the target conductor, and then the hanging wire is released after the UAV crosses the target conductor, such that the hanging wire is hanged on the target conductor. Ground staff raise the robot by pulling the hanging wire, and the operator can complete an operation on the ground, without a need to climb a tower or enter an electric field, improving operation safety. Most complex terrains can be covered without the help of large devices such as an insulated bucket arm truck, which achieves good applicability and portability, and improves operation efficiency. The UAV is used to carry a light hanging wire to help the robot walk onto a line, such that the robot can easily walk onto the line from an appropriate position and quickly walk to an installation position, reducing operation time.

In the figures: 101: hanging tray; 102: first wire hanging head; 103: wire hanging bracket; 104: second wire hanging head; 105: UAV; 106: left hanging rod; 107: bushing; 108: right hanging rod; 109: left rack; 110: right rack; 111: driving pipe; 112: friction rod; 113: friction wheel; 114: driving gear; 115: driving spring; 116: locking spring; 117: fixed shaft; 118: locking ring; 119: locking hole; 120: hanging spring; 121: hanging joint; 122: hanging ball; 123: protrusion; 124: groove; 125: notch; 126: blind hole; 127: through hole; 128: locking portion; 129: accommodation portion; 201: first hanging wire; 202: second hanging wire; 203: overturning stay wire; 3: target conductor; 401: overturning frame; 402: walking wheel; 403: driving motor; 404: support; 405: stayed pole; 406: workbench; 407: pressure spring; 408: square shaft; 409: stay wire head; 410: clamp seat; 411: tightening mechanism; 412: wire hanging point; 413: lockhole; 414: electric lock; 415: walking wheel installation groove; 5: puncture clamp.

DETAILED DESCRIPTION

Specific implementations of the present disclosure are further specifically described below with reference to the accompanying drawings and specific embodiments.

Embodiment 1

Figure 1:
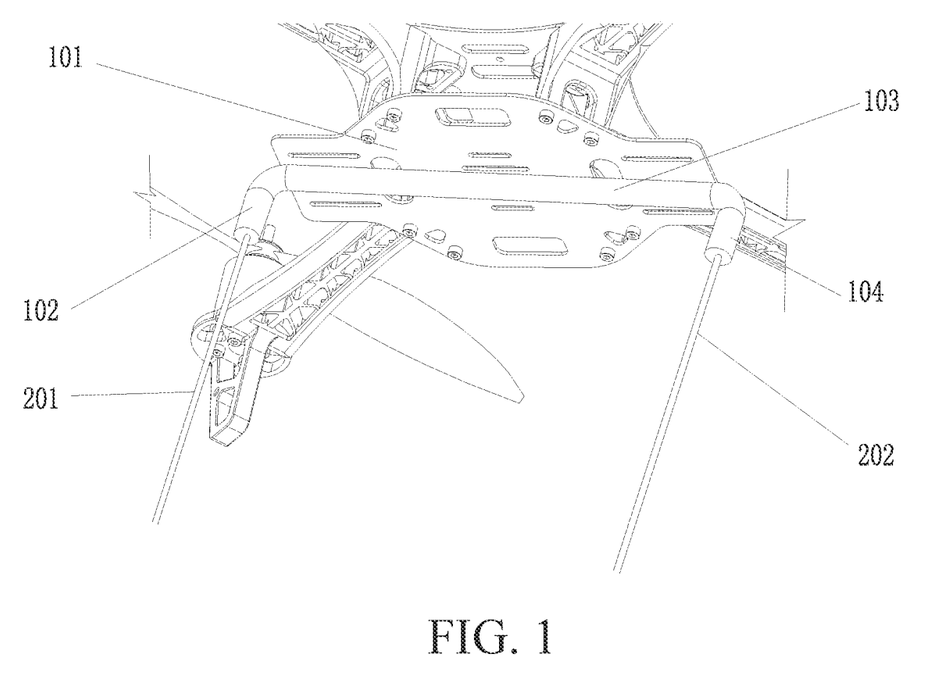
FIG. 1 is a schematic diagram of installing a wire hanging bracket according to Embodiment 1.
Figure 2:
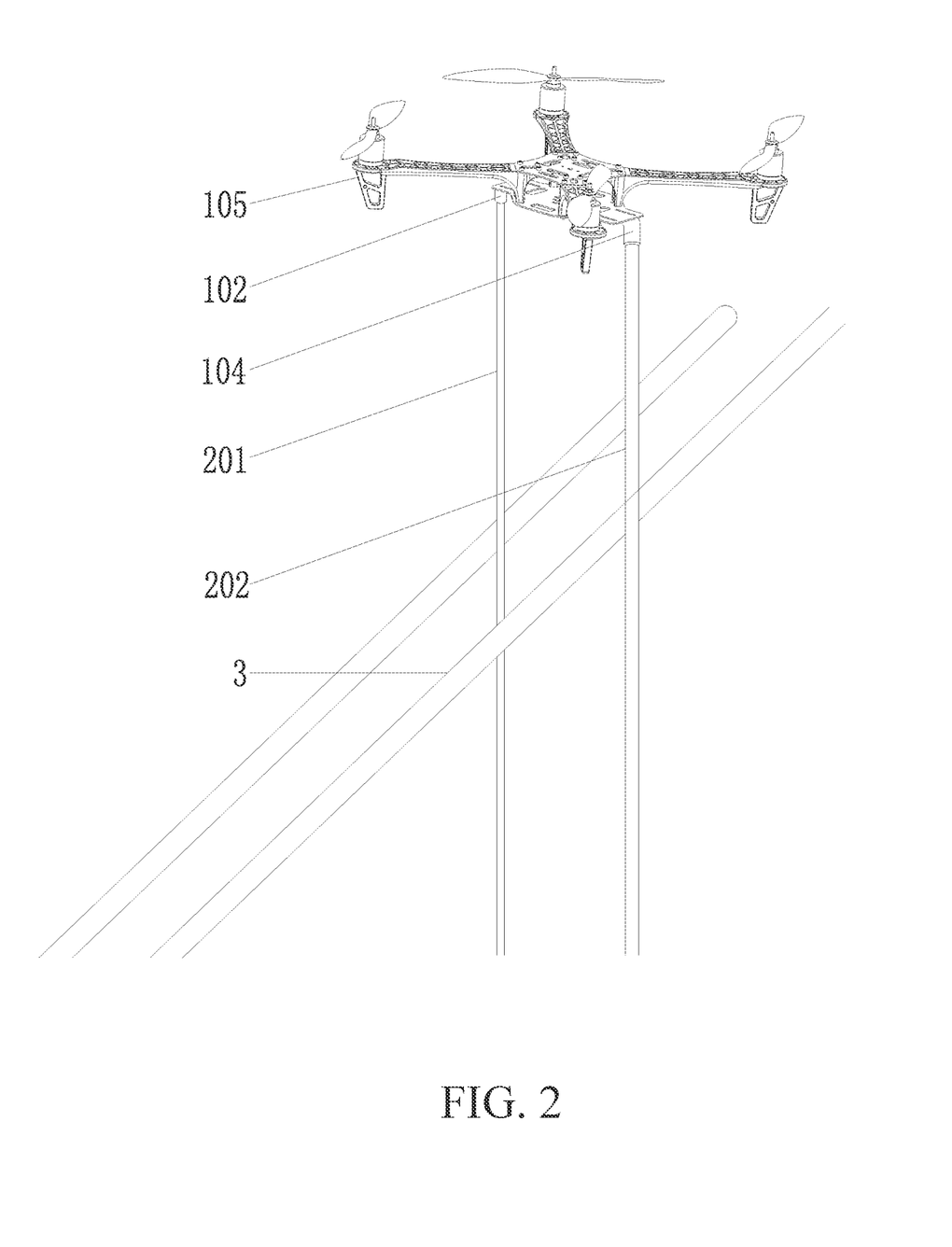
FIG. 2 is a schematic diagram of wire hanging by a UAV according to Embodiment 1.
Figure 3:
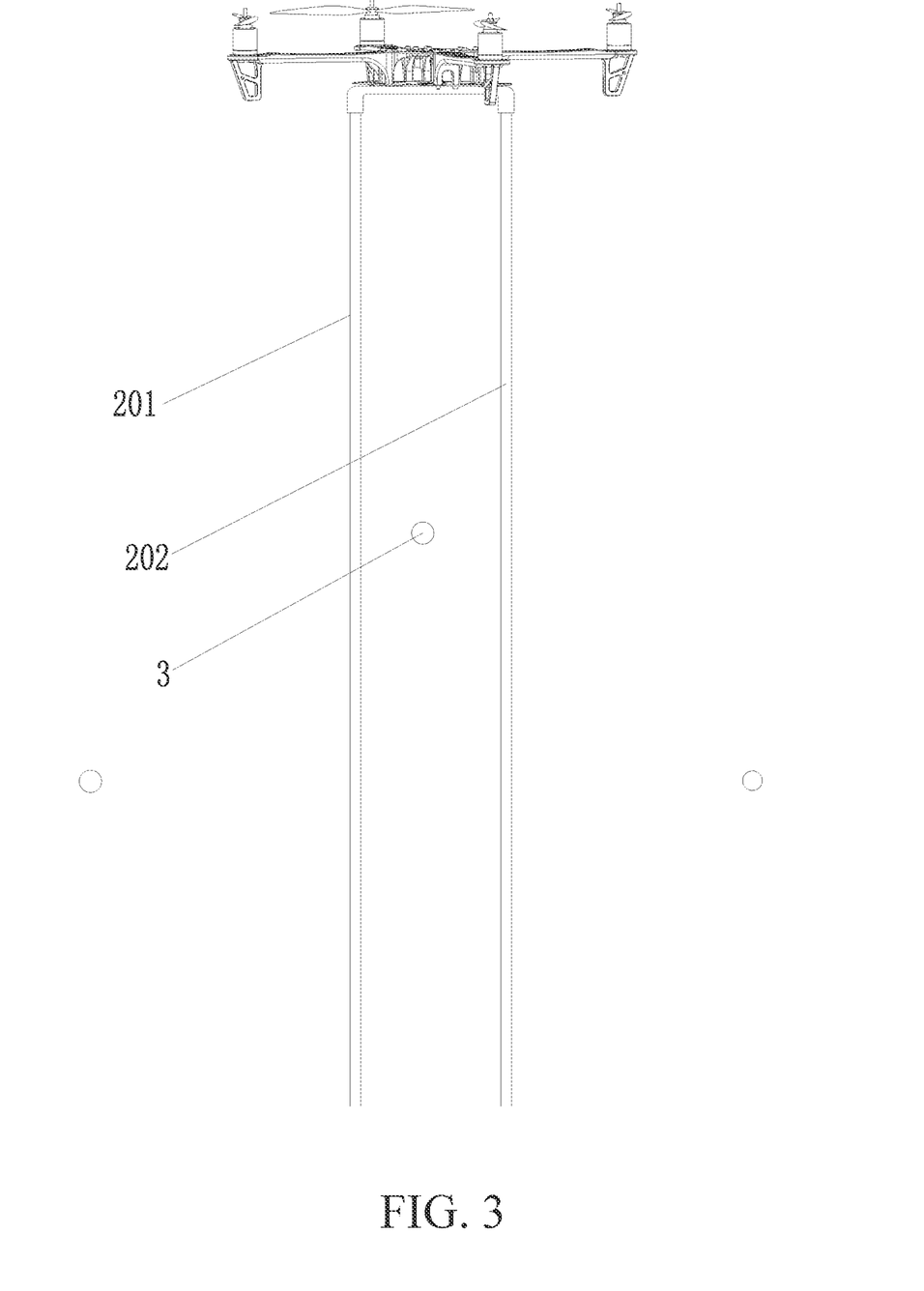
FIG. 3 is a schematic diagram of a result of wire hanging by a UAV according to Embodiment 1.

A UAV-assisted hanging ring robot for live installation and grounding is used together with a UAV 105, and includes a hanging tray 101, a wire hanging bracket 103, a hanging wire, an overturning stay wire 203, an overturning frame 401, a support 404, an electric lock 414, a walking wheel 402, a driving motor 403, a workbench 406, a clamp seat 410, a puncture clamp 5, a tightening mechanism 411, a remote controller, and a controller. As shown in FIG. 1, the hanging tray 101 is installed at a bottom of the UAV 105, the wire hanging bracket 103 is fixedly connected to the hanging tray 101, and the hanging wire is connected to the wire hanging bracket 103. As shown in FIG. 2 and FIG. 3, the hanging wire includes a first hanging wire 201 and a second hanging wire 202, both ends of the wire hanging bracket 103 are respectively connected to a first wire hanging head 102 and a second wire hanging head 104, the first hanging wire 201 is fixedly connected to the first wire hanging head 102, the second hanging wire 202 is connected to the second wire hanging head 104, the workbench 406 has two wire hanging points 412, and a length of the wire hanging bracket 103 corresponds to a distance between the two wire hanging points 412 of the workbench 406. The UAV 105 flies to above a target conductor 3, such that the first hanging wire 201 and the second hanging wire 202 are located on both sides of the target conductor 3 respectively. Then, the UAV 105 rotates along itself, such that the first hanging wire 201 and the second hanging wire 202 cling to the target conductor 3. The UAV 105 moves along a normal direction of the target conductor 3 to release one of the hanging wires, such as the first hanging wire 201, and makes both ends of the first hanging wire 201 hang on ground after hanging the first hanging wire 201 on the target conductor 3. After that, the UAV 105 moves reversely relative to the above movement along the normal direction to release the other hanging wire, such as the second hanging wire 202, such that both ends of the second hanging wire 202 hang on the ground after the second hanging wire 202 is hanged on the target conductor 3. In this way, the first hanging wire 201 and the second hanging wire 202 are hanged on the target conductor 3.

Figure 4:
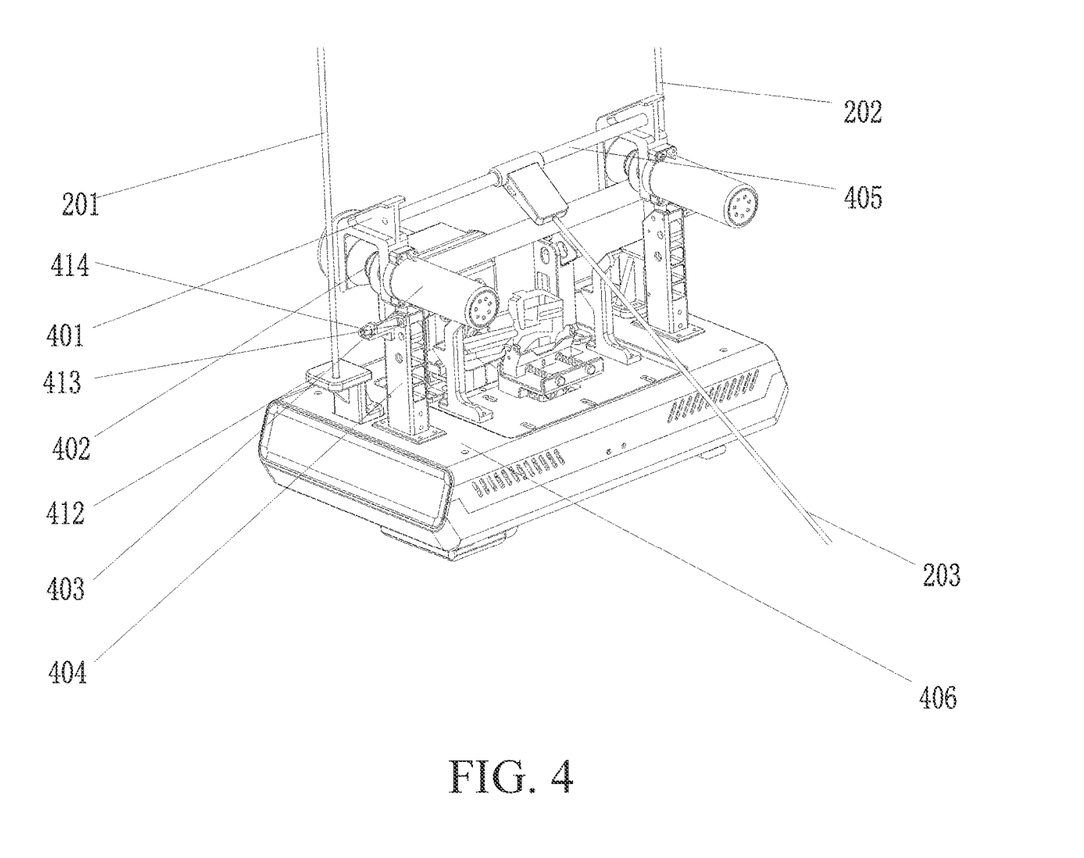
FIG. 4 is a schematic diagram of connecting a hanging wire to a robot according to Embodiment 1.
Figure 5:
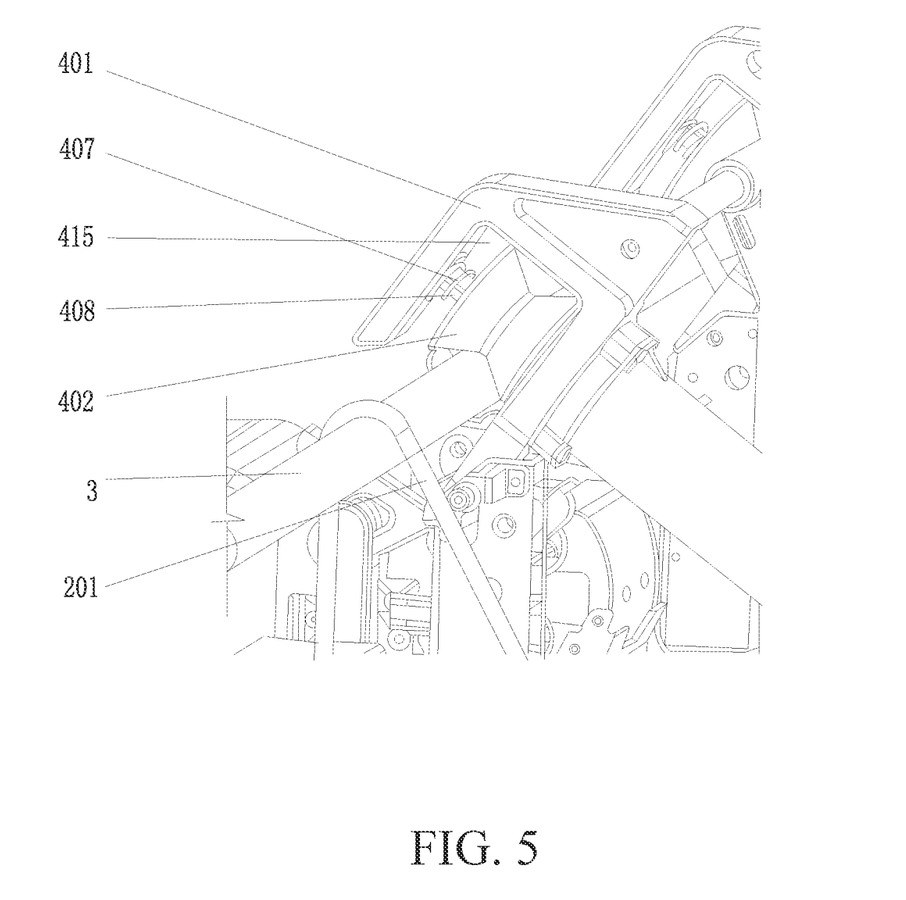
FIG. 5 is a schematic diagram of walking onto a line by a walking wheel of a robot according to Embodiment 1.
Figure 6:
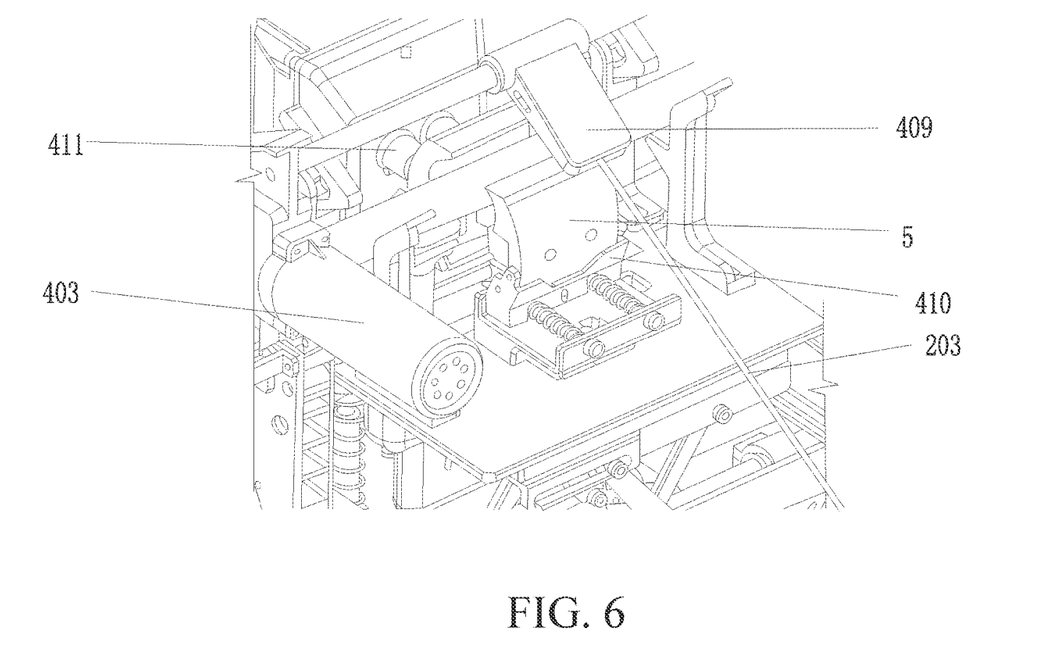
FIG. 6 is a schematic diagram of a clamp seat of a robot according to Embodiment 1.

As shown in FIG. 4, FIG. 5, and FIG. 6, both the support 404 and the clamp seat are installed on the workbench 406, the overturning frame 401 is rotatably installed on the support 404, the electric lock is installed on the support 404, the overturning frame 401 is provided with a lockhole 413 matching the electric lock, a stay wire head 409, and a stayed pole 405, the stayed pole 405 is fixedly installed on the overturning frame 401, the stay wire head 409 is rotatably connected to the stayed pole 405, and the overturning stay wire 203 is fixedly connected to the stay wire head 409. The walking wheel 402 is rotatably installed on the overturning frame 401, the driving motor 403 is installed on the overturning frame 401, the driving motor 403 is connected to a square shaft 408, the overturning frame 401 is provided with a walking wheel installation groove 415, the square shaft 408 is rotatably connected to the walking wheel installation groove 415, and the walking wheel 402 is connected to the square shaft 408. A pressure spring 407 is installed between the walking wheel 402 and the walking wheel installation groove 415, and the walking wheel 402 is connected to the driving motor 403. The puncture clamp 5 is installed on the clamp seat, the tightening mechanism is installed on the workbench 406 and connected to a tightening screw of the puncture clamp. The electric lock, the tightening mechanism, the driving motor 403, and the remote controller are connected to the controller.

This embodiment has the following beneficial effects: The hanging wire is lifted by the UAV 105, a lowest end of the hanging wire is raised to a position higher than the target conductor 3, and then the hanging wire is released after the UAV 105 crosses the target conductor 3, such that the hanging wire is hanged on the target conductor 3. Ground staff raise the robot by pulling the hanging wire, and an operator can complete an operation on the ground, without a need to climb a tower or enter an electric field, improving operation safety. Most complex terrains can be covered without the help of large devices such as an insulated bucket arm truck, which achieves good applicability and portability, and improves operation efficiency. The UAV 105 is used to carry a light hanging wire to help the robot walk onto a line, such that the robot can easily walk onto the line from an appropriate position and quickly walk to an installation position, reducing operation time.

Embodiment 2

Figure 7:
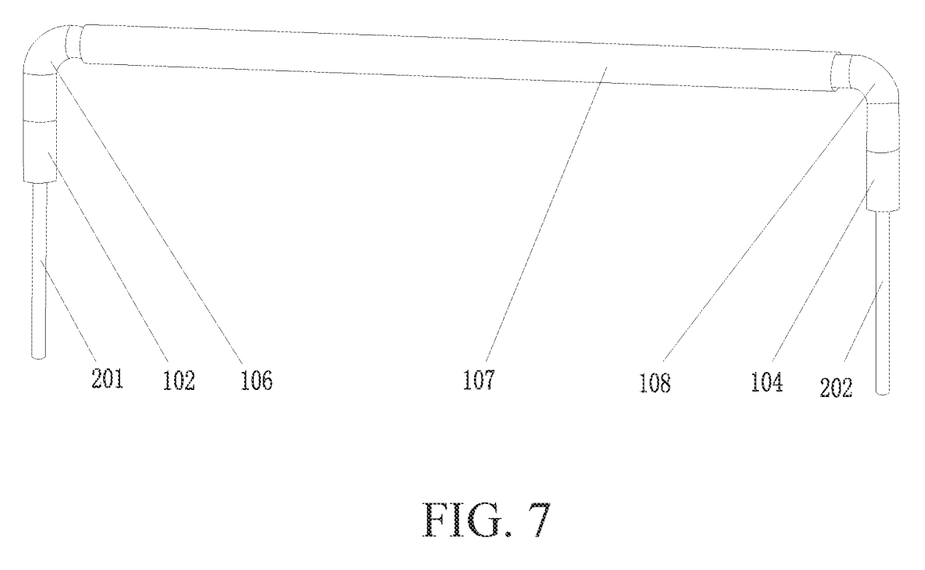
FIG. 7 is a schematic structural diagram of a wire hanging bracket according to Embodiment 2.
Figure 8:
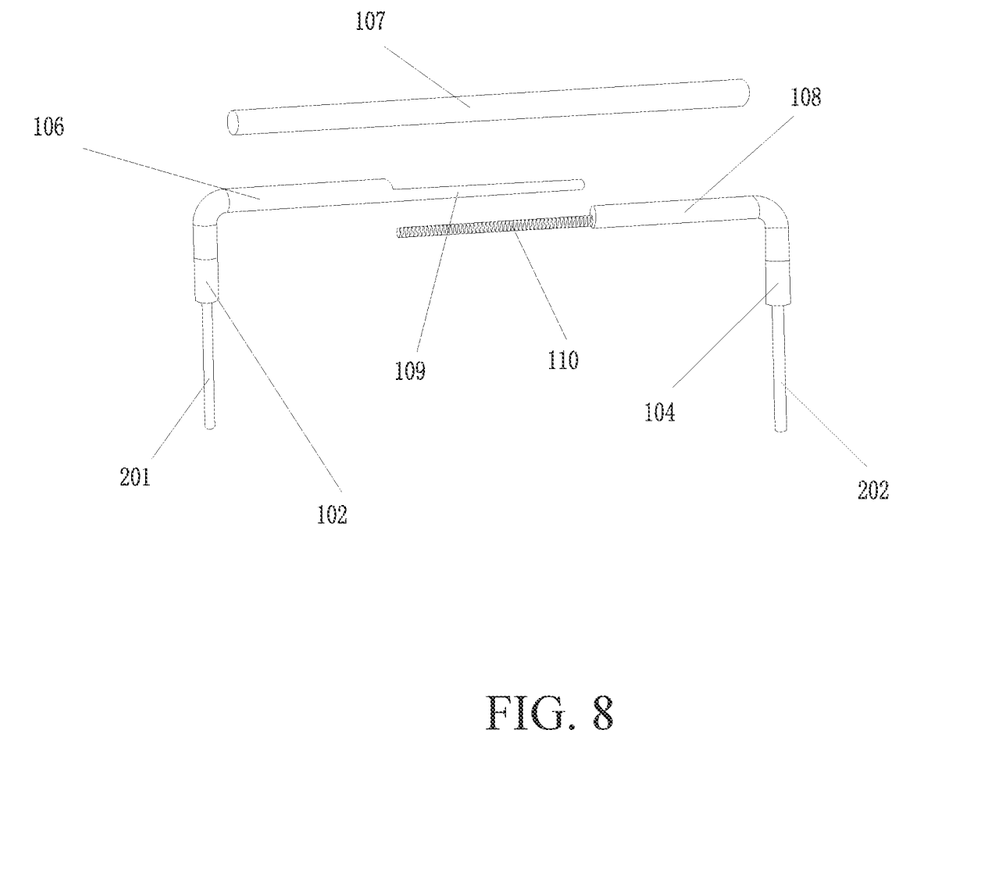
FIG. 8 is a structural exploded view of a wire hanging bracket according to Embodiment 2.

Based on Embodiment 1, this embodiment makes a further improvement to the wire hanging bracket 103. As shown in FIG. 7 and FIG. 8, in this embodiment, the wire hanging bracket 103 includes a bushing 107, a left hanging rod 106, a right hanging rod 108, a left rack 109, a right rack 110, a driving gear 114, and a driving mechanism. The left hanging rod 106 and the right hanging rod 108 are sleeved on a left and a right of the bushing 107 respectively, the left rack 109 is fixedly connected to the left hanging rod 106, the right rack 110 is fixedly connected to the right hanging rod 108, the driving gear 114 is rotatably connected to the bushing 107, the driving mechanism is connected to the driving gear 114, both the left rack 109 and the right rack 110 are meshed with the driving gear 114, the left hanging rod 106 is connected to the first wire hanging head 102, and the right hanging rod 108 is connected to the second wire hanging head 104. The driving mechanism drives the driving gear 114 to rotate, to drive the left rack 109 and the right rack 110 to move, such that extension elongations of the left hanging rod 106 and the right hanging rod 108 are changed to adjust the length of the wire hanging bracket 103 to adapt to different robots.

Figure 9:
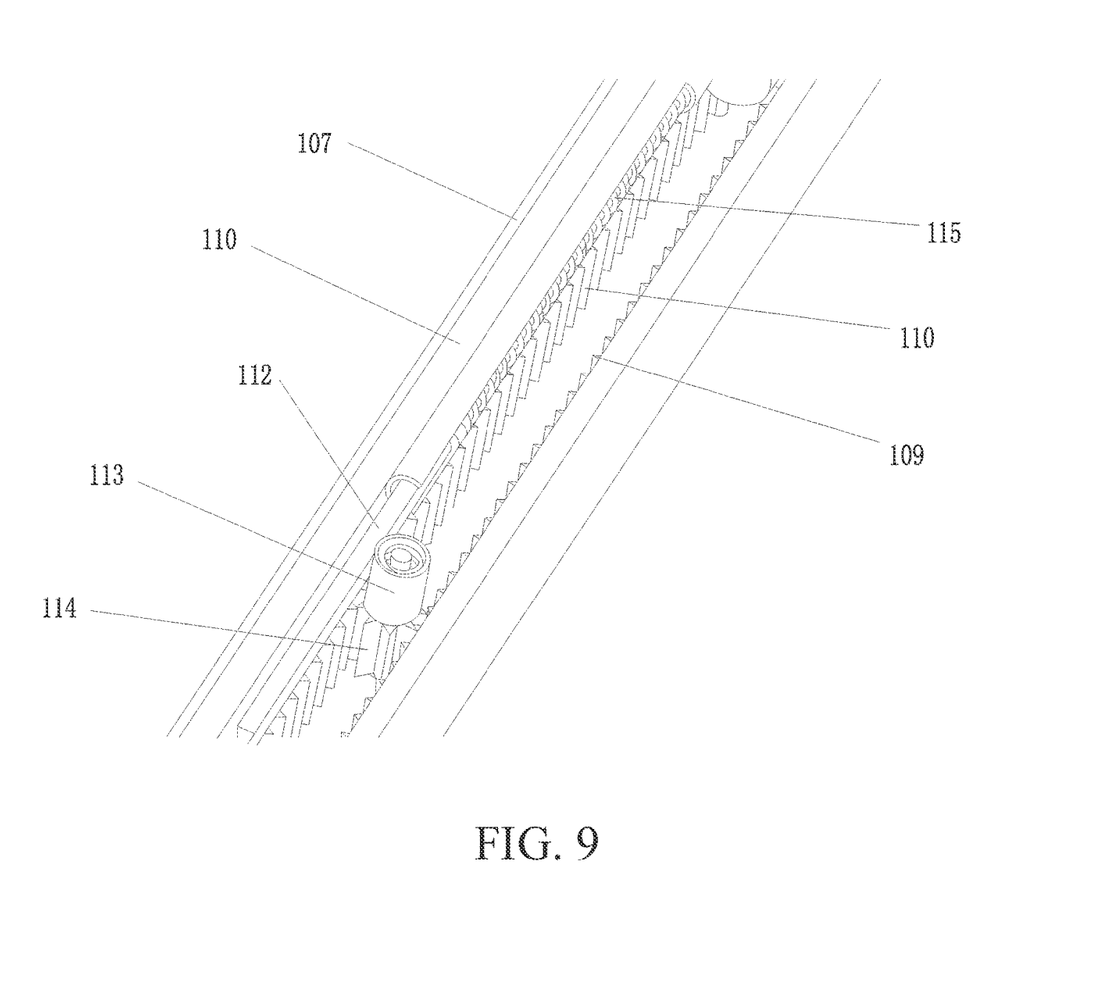
FIG. 9 is a schematic diagram of a driving mechanism of a wire hanging bracket according to Embodiment 2.
Figure 10:
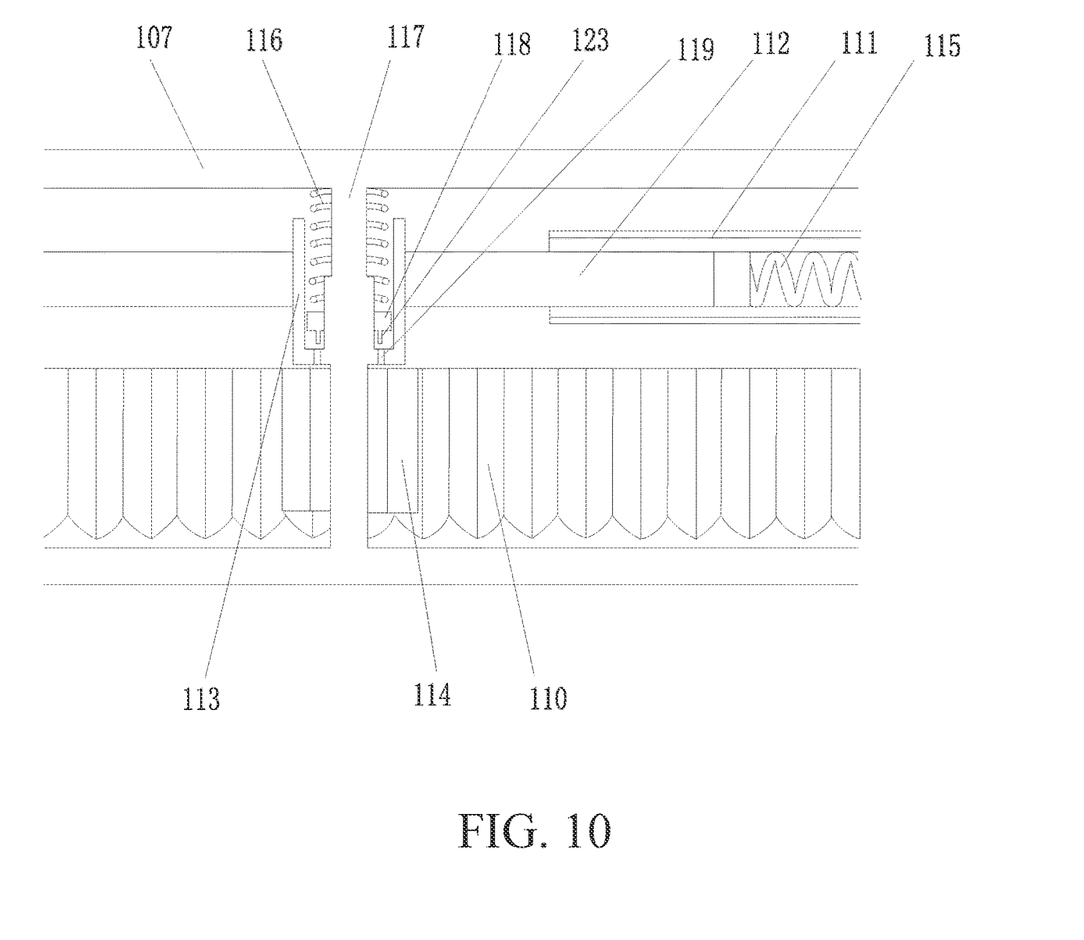
FIG. 10 is a schematic cross-sectional diagram of a driving mechanism of a wire hanging bracket according to Embodiment 2.

As shown in FIG. 9 and FIG. 10, the driving mechanism includes a friction rod 112, a friction wheel 113, a fixed shaft 117, a driving pipe 111, a driving spring 115, a locking spring 116, and a locking ring 118. The fixed shaft 117 is fixedly connected to the bushing 107, the driving gear 114 is rotatably connected to the fixed shaft 117, the friction wheel 113 is concentrically and fixedly connected to the driving gear 114, the driving pipe 111 is fixedly connected to the bushing 107, the driving spring 115 is installed in the driving pipe 111, one end of the friction rod 112 is sleeved into the driving pipe 111, one end of the driving spring 115 is fixedly connected to the driving pipe 111, the other end of the driving spring 115 is fixedly connected to the friction rod 112, both ends of the driving spring 115 are connected to an electronic switch K1 and a DC power supply BT1 respectively by using wires, the friction rod 112 is abutted with the friction wheel 113, the friction wheel 113 is hollow and provided with an opening at one end away from the driving gear 114, one end, close to the driving gear 114, of the friction wheel 113 is provided with a locking hole 119, the locking ring 118 is sleeved on the fixed shaft 117, the fixed shaft 117 is provided with a clamping strip, the locking ring 118 is provided with a clamping groove, the clamping strip is clamped with the clamping groove, the locking ring 118 is provided with a protrusion 123 matching the locking hole 119, one end of the locking spring 116 is fixedly connected to the locking ring 118, the other end of the locking spring 116 is fixedly connected to the bushing 107, and both ends of the locking spring 116 are connected to an electronic switch K2 and a DC power supply BT2 respectively by using wires. The driving spring 115 contracts when a current is applied to the driving spring 115. An amount of contraction is related to the applied current. A size of the current applied to the driving spring 115 is adjusted through PWM control of the electronic switch K1, so as to control the amount of contraction of the driving spring 115. Similarly, the locking ring 118 and the locking hole 119 are locked or separated through PWM control of the electronic switch K2. When the driving spring 115 contracts, the friction rod 112 is driven to move, so as to drive the friction wheel 113 to rotate, in other words, drive the driving gear 114 to rotate. When the electronic switch K1 remains disconnected, the driving spring 115 stretches, and the friction wheel 113 rotates reversely. In this case, the electronic switch K2 is also controlled to be disconnected, and the locking spring 116 stretches to tightly lock the locking ring 118 and the locking hole 119. In this way, the friction wheel 113 cannot rotate reversely because it is locked, in other words, the driving gear 114 rotates along one direction. The friction wheel 113 only needs to be locked when the driving spring 115 contracts and unlocked when the driving spring 115 stretches, to make the driving gear 114 rotate along another direction.

Circuit structures of the above electronic switches K1 and K2, and DC power supplies BT1 and BT2 are the same as those of the following electronic switch K3 and DC power supply BT3.

Figure 11:
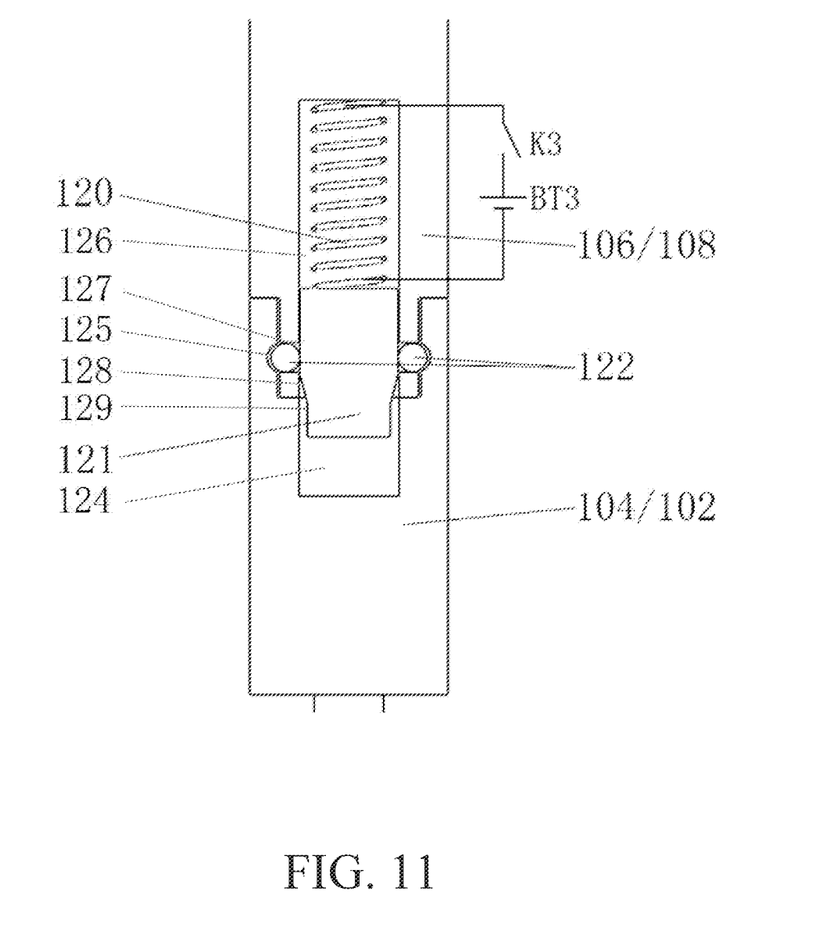
FIG. 11 is a schematic cross-sectional diagram of a hanging mechanism according to Embodiment 2.

As shown in FIG. 11, the first wire hanging head 102 and the second wire hanging head 104 each are provided with a groove 124, an inner wall of the groove is provided with a notch 125, tail ends of the left hanging rod 106 and the right hanging rod 108 each are installed with a hanging mechanism, the hanging mechanism is connected to the groove 124 and includes a hanging spring 120, a hanging joint 121, and a hanging ball 122, the tail ends of the left hanging rod 106 and the right hanging rod 108 each are provided with a blind hole 126, a wall of the blind hole 126 is provided with a through hole 127 along a radial direction, the hanging ball 122 is placed in the through hole 127, the hanging joint 121 is sleeved into an opening of the blind hole 126, one end of the hanging spring 120 is fixedly connected to the bottom of the blind hole, the other end of the hanging spring 120 is connected to the hanging joint 121, both ends of the hanging spring 120 are connected to an electronic switch K3 and a DC power supply BT3 respectively by using wires, the hanging joint 121 matches the grooves 124 of the first wire hanging head 102 and the second wire hanging head 104, the hanging joint 121 is abutted with the hanging spring 120, an outer wall of the hanging joint 121 is provided with a locking portion 128 for extruding the hanging ball 122 out of outer walls of the left hanging rod 106 and the right hanging rod 108, and the outer wall of the hanging joint 121 is further provided with an accommodation portion 129 for retracting the hanging ball 122 into the outer walls of the left hanging rod 106 and the right hanging rod 108. When the hanging spring 120 contracts, the hanging joint 121 is pulled to rise, such that the accommodation portion 129 is abutted with the hanging ball 122. The first wire hanging head 102 and the second wire hanging head 104 squeeze the hanging ball 122 into the left hanging rod 106 and the right hanging rod 108 under the action of gravity, and the first wire hanging head 102 and the second wire hanging head 104 immediately fall to the ground.

The above embodiments are merely preferred solutions of the present disclosure and is not intended to limit the present disclosure in any form, and other variations and modifications may be made without departing from the technical solution of the present disclosure as set forth in the appended claims.

The invention claimed is:

1. An unmanned aerial vehicle (UAV)-assisted hanging ring robot for live installation and grounding, used together with a UAV, and comprising:
   a hanging tray, a wire hanging bracket, a hanging wire, an overturning stay wire, an overturning frame, a support, an electric lock, a walking wheel, a driving motor, a workbench, a clamp seat, a puncture clamp, a tightening mechanism, a remote controller, and a controller, wherein
   the hanging tray is installed at a bottom of the UAV, the wire hanging bracket is fixedly connected to the hanging tray, and the hanging wire is connected to the wire hanging bracket;

both the support and the clamp seat are installed on the workbench, the overturning frame is rotatably installed on the support, the electric lock is installed on the support, the overturning frame is provided with a lockhole matching the electric lock, one end of the overturning stay wire is connected to the overturning frame, the other end of the overturning stay wire hangs on ground, the walking wheel is rotatably installed on the overturning frame, the driving motor is installed on the overturning frame, and the walking wheel is connected to the driving motor;

the puncture clamp is installed on the clamp seat, and the tightening mechanism is installed on the workbench and connected to a tightening screw of the puncture clamp; and the electric lock, the tightening mechanism, the driving motor, and the remote controller are connected to the controller.

2. The UAV-assisted hanging ring robot for live installation and grounding according to claim 1, further comprising:
a first wire hanging head and a second wire hanging head, wherein the hanging wire comprises a first hanging wire and a second hanging wire, both ends of the wire hanging bracket are respectively connected to the first wire hanging head and the second wire hanging head, the first hanging wire is fixedly connected to the first wire hanging head, the second hanging wire is connected to the second wire hanging head, the workbench is provided with two wire hanging points, and a length of the wire hanging bracket corresponds to a distance between the two wire hanging points of the workbench.

3. The UAV-assisted hanging ring robot for live installation and grounding according to claim 2, wherein
the wire hanging bracket comprises a bushing, a left hanging rod, a right hanging rod, a left rack, a right rack, a driving gear, and a driving mechanism, the left hanging rod and the right hanging rod are sleeved on a left and a right of the bushing respectively, the left rack is fixedly connected to the left hanging rod, the right rack is fixedly connected to the right hanging rod, the driving gear is rotatably connected to the bushing, the driving mechanism is connected to the driving gear, both the left rack and the right rack are meshed with the driving gear, the left hanging rod is connected to the first wire hanging head, and the right hanging rod is connected to the second wire hanging head.

4. The UAV-assisted hanging ring robot for live installation and grounding according to claim 3, wherein
the driving mechanism comprises a friction rod, a friction wheel, a fixed shaft, a driving pipe, a driving spring, a locking spring, and a locking ring, the fixed shaft is fixedly connected to the bushing, the driving gear is rotatably connected to the fixed shaft, the friction wheel is concentrically and fixedly connected to the driving gear, the driving pipe is fixedly connected to the bushing, the driving spring is installed in the driving pipe, one end of the friction rod is sleeved into the driving pipe, one end of the driving spring is fixedly connected to the driving pipe, the other end of the driving spring is fixedly connected to the friction rod, both ends of the driving spring are connected to an electronic switch K1 and a direct current (DC) power supply BT1 respectively by using wires, the friction rod is abutted with the friction wheel, the friction wheel is hollow and provided with an opening at one end away from the driving gear, one end, close to the driving gear, of the friction wheel is provided with a locking hole, the locking ring is sleeved on the fixed shaft, the fixed shaft is provided with a clamping strip, the locking ring is provided with a clamping groove, the clamping strip is clamped with the clamping groove, the locking ring is provided with a protrusion matching the locking hole, one end of the locking spring is fixedly connected to the locking ring, the other end of the locking spring is fixedly connected to the bushing, and both ends of the locking spring are connected to an electronic switch K2 and a DC power supply BT2 respectively by using wires.

5. The UAV-assisted hanging ring robot for live installation and grounding according to claim 3, wherein
the first wire hanging head and the second wire hanging head each are provided with a groove, an inner wall of the groove is provided with a notch, tail ends of the left hanging rod and the right hanging rod each are installed with a hanging mechanism, and the hanging mechanism is connected to the groove; and the hanging mechanism comprises a hanging spring, a hanging joint, and a hanging ball, the tail ends of the left hanging rod and the right hanging rod each are provided with a blind hole, a wall of the blind hole is provided with a through hole along a radial direction, the hanging ball is placed in the through hole, the hanging joint is sleeved into an opening of the blind hole, one end of the hanging spring is fixedly connected to a bottom of the blind hole, the other end of the hanging spring is connected to the hanging joint, both ends of the hanging spring are connected to an electronic switch K3 and a DC power supply BT3 respectively by using wires, the hanging joint matches the grooves of the first wire hanging head and the second wire hanging head, the hanging joint is abutted with the hanging spring, an outer wall of the hanging joint is provided with a locking portion for extruding the hanging ball out of outer walls of the left hanging rod and the right hanging rod, and the outer wall of the hanging joint is further provided with an accommodation portion for retracting the hanging ball into the outer walls of the left hanging rod and the right hanging rod.

6. The UAV-assisted hanging ring robot for live installation and grounding according to claim 1, further comprising:
a stay wire head and a stayed pole, wherein the stayed pole is fixedly installed on the overturning frame, the stay wire head is rotatably connected to the stayed pole, and the overturning stay wire is fixedly connected to the stay wire head.

7. The UAV-assisted hanging ring robot for live installation and grounding according to claim 1, further comprising:
a pressure spring, wherein the driving motor is connected to a square shaft, the overturning frame is provided with a walking wheel installation groove, the square shaft is rotatably connected to the walking wheel installation groove, the walking wheel is connected to the square shaft, and the pressure spring is installed between the walking wheel and the walking wheel installation groove.

8. The UAV-assisted hanging ring robot for live installation and grounding according to claim 4, wherein
the first wire hanging head and the second wire hanging head each are provided with a groove, an inner wall of the groove is provided with a notch, tail ends of the left hanging rod and the right hanging rod each are installed with a hanging mechanism, and the hanging mechanism is connected to the groove; and the hanging mechanism comprises a hanging spring, a hanging joint, and a hanging ball, the tail ends of the left hanging rod and the right hanging rod each are provided with a blind hole, a wall of the blind hole is provided with a through hole along a radial direction, the hanging ball is placed in the through hole, the hanging joint is sleeved into an opening of the blind hole, one end of the hanging spring is fixedly connected to a bottom of the blind hole, the other end of the hanging spring is connected to the hanging joint, both ends of the hanging spring are connected to an electronic switch K3 and a DC power supply BT3 respectively by using wires, the hanging joint matches the grooves of the first wire hanging head and the second wire hanging head, the hanging joint is abutted with the hanging spring, an outer wall of the hanging joint is provided with a locking portion for extruding the hanging ball out of outer walls of the left hanging rod and the right hanging rod, and the outer wall of the hanging joint is further provided with an accommodation portion for retracting the hanging ball into the outer walls of the left hanging rod and the right hanging rod.

9. The UAV-assisted hanging ring robot for live installation and grounding according to claim 2, further comprising:
a stay wire head and a stayed pole, wherein the stayed pole is fixedly installed on the overturning frame, the stay wire head is rotatably connected to the stayed pole, and the overturning stay wire is fixedly connected to the stay wire head.

10. The UAV-assisted hanging ring robot for live installation and grounding according to claim 3, further comprising:
a stay wire head and a stayed pole, wherein the stayed pole is fixedly installed on the overturning frame, the stay wire head is rotatably connected to the stayed pole, and the overturning stay wire is fixedly connected to the stay wire head.

11. The UAV-assisted hanging ring robot for live installation and grounding according to claim 4, further comprising:
a stay wire head and a stayed pole, wherein the stayed pole is fixedly installed on the overturning frame, the stay wire head is rotatably connected to the stayed pole, and the overturning stay wire is fixedly connected to the stay wire head.

12. The UAV-assisted hanging ring robot for live installation and grounding according to claim 2, further comprising:
a pressure spring, wherein the driving motor is connected to a square shaft, the overturning frame is provided with a walking wheel installation groove, the square shaft is rotatably connected to the walking wheel installation groove, the walking wheel is connected to the square shaft, and the pressure spring is installed between the walking wheel and the walking wheel installation groove.

13. The UAV-assisted hanging ring robot for live installation and grounding according to claim 3, further comprising:
a pressure spring, wherein the driving motor is connected to a square shaft, the overturning frame is provided with a walking wheel installation groove, the square shaft is rotatably connected to the walking wheel installation groove, the walking wheel is connected to the square shaft, and the pressure spring is installed between the walking wheel and the walking wheel installation groove.

14. The UAV-assisted hanging ring robot for live installation and grounding according to claim 4, further comprising:
a pressure spring, wherein the driving motor is connected to a square shaft, the overturning frame is provided with a walking wheel installation groove, the square shaft is rotatably connected to the walking wheel installation groove, the walking wheel is connected to the square shaft, and the pressure spring is installed between the walking wheel and the walking wheel installation groove.

\* \* \* \* \*